UNITED STATES PATENT OFFICE.

HOWARD LANE, OF BIRMINGHAM, ENGLAND, ASSIGNOR TO INTERNATIONALE WASSERSTOFF AKTIENGESELLSCHAFT, OF FRANKFORT-ON-THE-MAIN, GERMANY, A CORPORATION OF GERMANY.

PROCESS OF PURIFYING CRUDE GAS.

1,040,218.     Specification of Letters Patent.      Patented Oct. 1, 1912.

No Drawing. Original application filed July 16, 1910, Serial No. 572,410. Divided and this application filed December 9, 1911. Serial No. 664,786.

*To all whom it may concern:*

Be it known that I, HOWARD LANE, a subject of the King of Great Britain, and resident of 125 Edmund street, Birmingham, in the county of Warwick, England, have invented a Process of Purifying Crude Gas, of which the following is a specification.

This application is a division of my application for a patent for the same invention filed July 16th, 1910, Serial No. 572410 patented May 7, 1912, No. 1,025,918.

The invention relates to the purification of gases generally and more particularly to the purification of the crude gases (such as water gas, coal gas and other gases generated from carbonaceous fuel) employed as reducing agents in the process of producing hydrogen by the alternate oxidation and deoxidation of a metal. When this process of manufacturing hydrogen is worked on a commercial scale it has been found that its efficiency tends to gradually decrease until the process becomes almost inoperative owing to the presence of sulfur and other impurities *e. g.* sulfurous acid, sulfureted hydrogen, carbon dioxid moisture and the like.

The object of the present invention is to purify the crude reducing gas more completely than heretofore.

The invention consists in first compressing the impure gas to a pressure of several atmospheres and then causing the gas, while still under pressure, to flow in contact with an oppositely flowing stream of water.

I have discovered that a certain quantity of impurity is removed for every atmosphere of pressure of the gas, hence in order to obtain a high degree of purity, the gases must be highly compressed as the final degree of purity of the gas treated is directly proportional to the degree to which it is initially compressed. For example when water gas containing 5% of impurities (which is approximately the usual amount in gas obtained in the usual manner) is to be treated, it has been found that it is desirable to compress the gas to a pressure between 70 and 100 pounds per square inch. Nevertheless to obtain a very high degree of purity indeed the gas may be compressed to a pressure of two tons to a square inch.

In order to increase the effectiveness of the washing operation, I sub-divide the oppositely flowing streams of gas and water by causing them to pass over pieces of natural material such as coke, with the result that all the chemical impurities contained in the gas either become condensed or dissolved in the water.

Claim—

The herein described process of purifying crude gas which consists in first compressing the gas to a pressure of several atmospheres and then causing the gas so compressed to flow in contact and concurrently with an oppositely flowing stream of water through a mass of comminuted neutral material.

HOWARD LANE.

Witnesses:
H. D. JAMESON,
O. J. WORTH.